(12) United States Patent
Walterscheid

(10) Patent No.: US 6,321,399 B1
(45) Date of Patent: Nov. 27, 2001

(54) EXTRUDED BUNK STEP FOR BUNK BED

(75) Inventor: Wade J. Walterscheid, Rosston, TX (US)

(73) Assignee: Paccar INC, Bellevue, WA (US)

( * ) Notice: Subject to any disclaimer, the term of this patent is extended or adjusted under 35 U.S.C. 154(b) by 0 days.

(21) Appl. No.: 09/491,285

(22) Filed: Jan. 25, 2000

(51) Int. Cl.[7] .............................. A47C 19/02; A47C 17/86
(52) U.S. Cl. ......................... 5/118; 5/193; 5/663; 5/507.1
(58) Field of Search ................... 5/9.1, 118, 193, 5/425, 507.1, 663, 400, 412, 280, 286, 207, 208, 678, 679; 182/92

(56) References Cited

U.S. PATENT DOCUMENTS

| | | | |
|---|---|---|---|
| 2,127,442 | * | 8/1938 | Dowdy ............................... 5/507.1 X |
| 3,008,534 | * | 11/1961 | Von Canon, Jr. ..................... 5/9.1 X |
| 3,629,881 | * | 12/1971 | Hinshaw ............................. 5/507.1 |
| 4,084,276 | * | 4/1978 | Trexler et al. ........................... 5/118 |
| 4,193,146 | * | 3/1980 | Fredman et al. ......................... 5/9.1 |
| 4,514,871 | * | 5/1985 | Fisher .................................... 5/663 |
| 5,203,040 | * | 4/1993 | Hochschild, III ....................... 5/678 |
| 5,867,853 | * | 2/1999 | Feld ....................................... 5/663 |

* cited by examiner

Primary Examiner—Michael F. Trettel
(74) Attorney, Agent, or Firm—Sidley Austin Brown & Wood

(57) ABSTRACT

A bunk front (10) is disclosed for use with a bunk (12) in a vehicle such as a tractor. The bunk front (10) is formed of an extrusion (22) with a first portion (24) and a second portion (28). The first portion (24) has an upper section (32) and a lower section (34) forming an opening therebetween (26). The first portion (24) is secured on the front end of the bunk (12) by a series of teeth (40) on the first and second sections (32, 34), the wedging of the sections and, preferably an adhesive as well. The second portion (28) forms a step (30) which can be either covered by or exposed by a covering (64) depending on whether the bunk front (10) is to be utilized as a step or not.

18 Claims, 4 Drawing Sheets

EXTRUDED BUNK STEP FOR BUNK BED

TECHNICAL FIELD OF THE INVENTION

This invention relates to a bunk bed for use in a sleeper portion of a tractor used to haul a semi trailer.

BACKGROUND OF THE INVENTION

Many tractors used to haul semi trailers, such as the common 18-wheeler, are provided with sleeping quarters for the operators. A common configuration is a bunk bed arrangement with a lower bunk extending lengthwise across the width of the tractor and an upper bunk directly thereabove.

The lower bunk is commonly mounted on hinges to allow the bunk itself to be lifted up to expose a storage area thereunder. Also, often elaborate devices and ladders are utilized to provide access to the upper bunk. These devices are complicated, expensive and occupy critical space within the sleeper compartment. A need exists for an improved design which minimizes cost, maximizes use of the available space and is attractive to the operator.

SUMMARY OF THE INVENTION

In accordance with one aspect of the present invention, a bunk front is provided for a bunk used in a vehicle. The bunk has a portion formed of a uniform thickness adjacent to the front edge of a bunk. The bunk front has a first portion having an opening for placement over the portion of the bunk, the first portion having engagement members to engage the portion of the bunk to secure the first portion on the bunk. A second portion forms a step thereon.

In accordance with additional aspects of the present invention, the engagement members of the first portion are in the form of teeth which engage the portion of the bunk. Adhesive can also be used to assist the engagement between the first portion of the bunk front and the portion of the bunk. The bunk front can be extruded of a material, such as aluminum. A pad can be placed over at least the first portion of the bunk front. When the bunk front is used as a step, the pad can have a cutout to expose the step.

BRIEF DESCRIPTION OF THE DRAWINGS

For a more complete understanding of the present invention and the advantages thereof, reference is now made to the following description taken into conjunction with the accompanying drawings, in which.

DETAILED DESCRIPTION OF THE INVENTION

With reference now to the figures, and the accompanying text, an embodiment of the present invention will be described.

Figure 1:
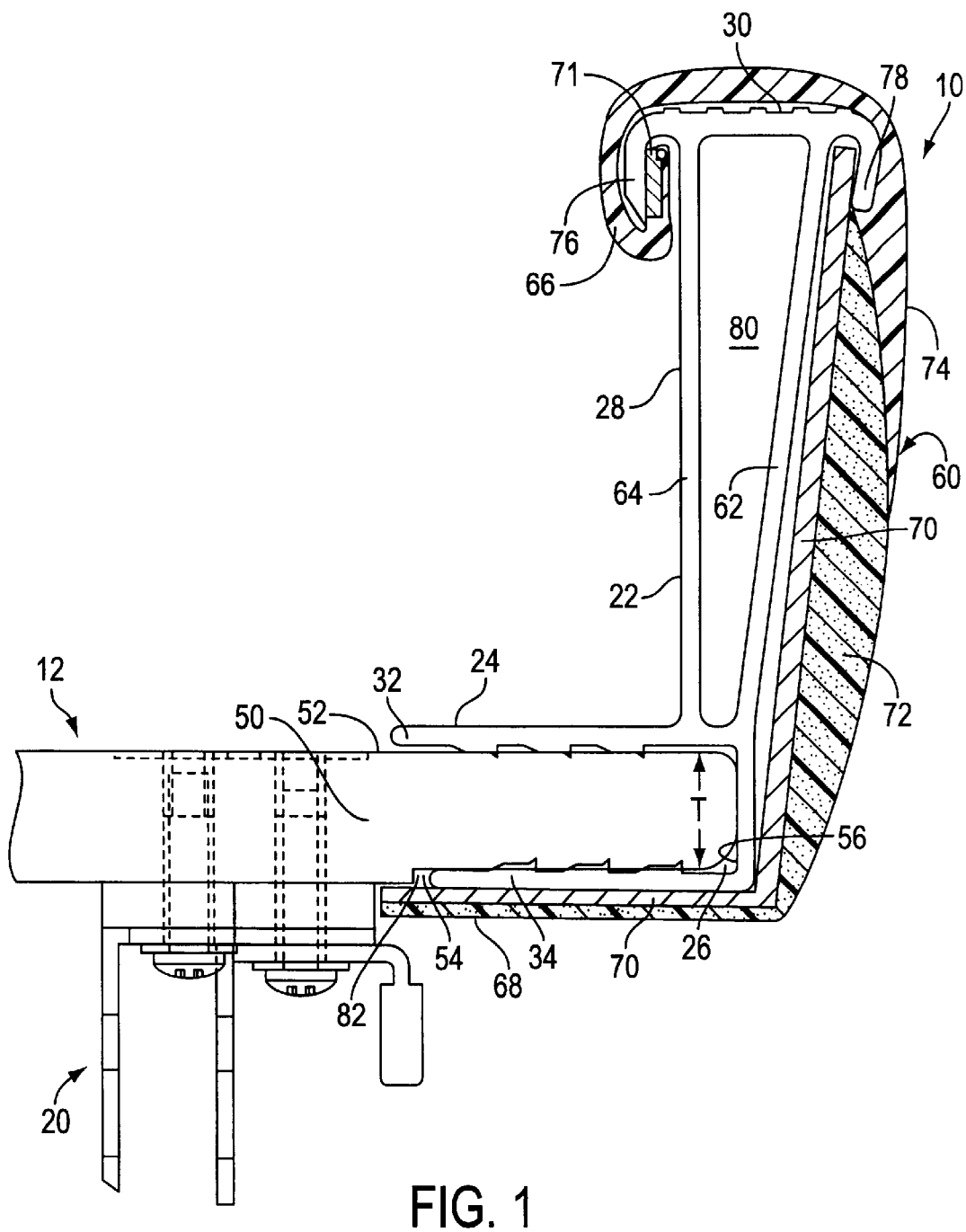
FIG. 1 is a partial cross-sectional view of a bunk step attached to a bunk forming a first embodiment of the present invention.

FIG. 1 illustrates a bunk front 10 which is mounted on the front of bunk 12 such as is used in a tractor or other vehicle. As will be described hereinafter, the bunk front 10 can be utilized as a step as well, if desired. The bunk front 10 is designed for quick installation on the bunk 12 with a minimum of complexity, while providing a secure attachment.

Figure 4:
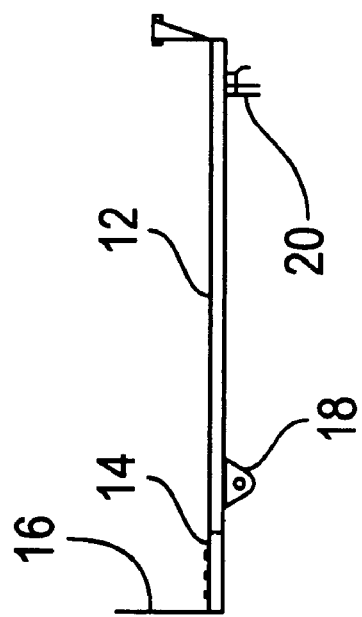
FIG. 4 is a side view of the bunk step mounted on the bunk.
Figure 5:
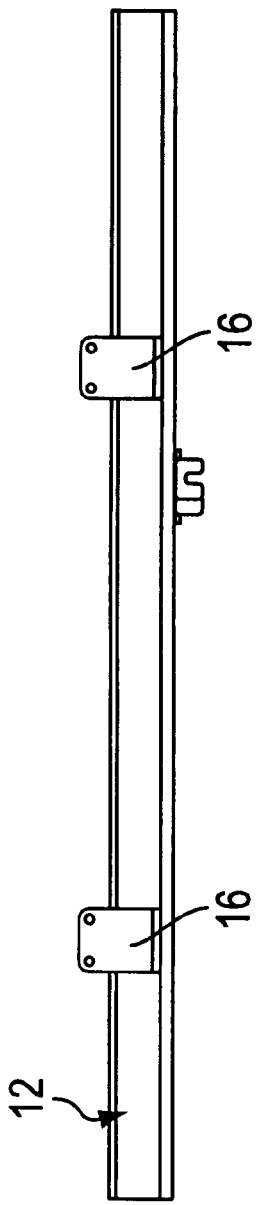
FIG. 5 is a back view of the bunk.
Figure 6:
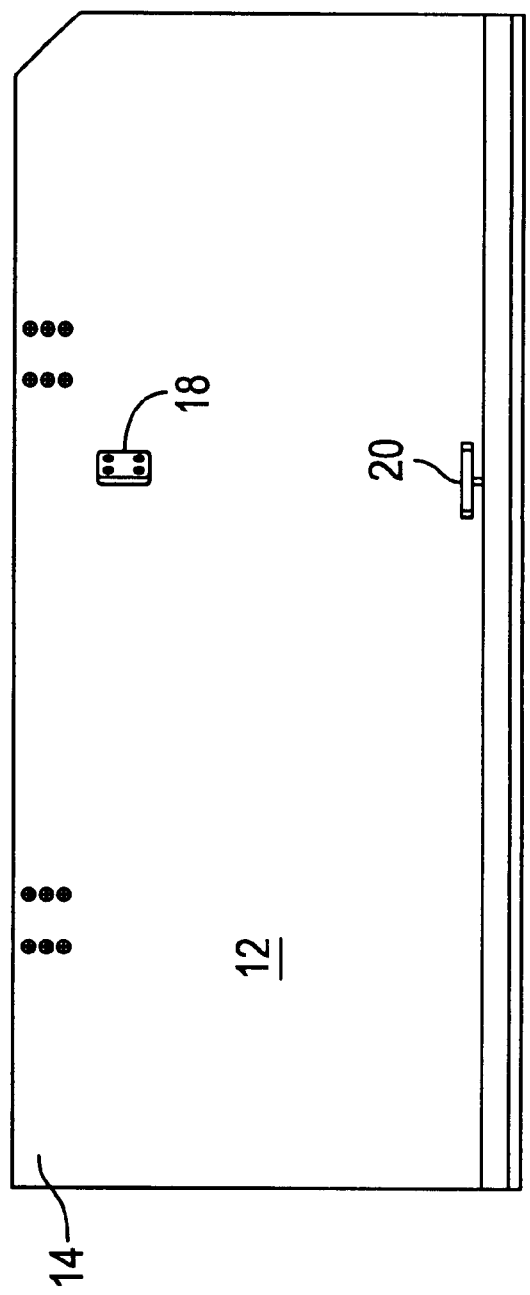
FIG. 6 is a bottom view of the bunk.

The bunk 12 is mounted at its opposite, back end 14 (FIGS. 4, 5, 6) through hinge brackets 16 to the vehicle body. This permits the bunk 12 to be pivoted about hinges from the normal, horizontal position, to an up tilted position, allowing access to a compartment or storage area beneath the bunk 12. This movement is assisted by a gas spring (not shown) which mounts at one end thereof to the bracket 18. The gas spring compensates for the weight of the bunk 12 to allow it to be more easily moved from the horizontal position to an elevated position to access the area under the bunk.

Near the front of the bunk 12 is a latch assembly 20 which allows the bunk 12 to be latched in the horizontal position to prevent the bunk from being lifted up.

Figure 2:
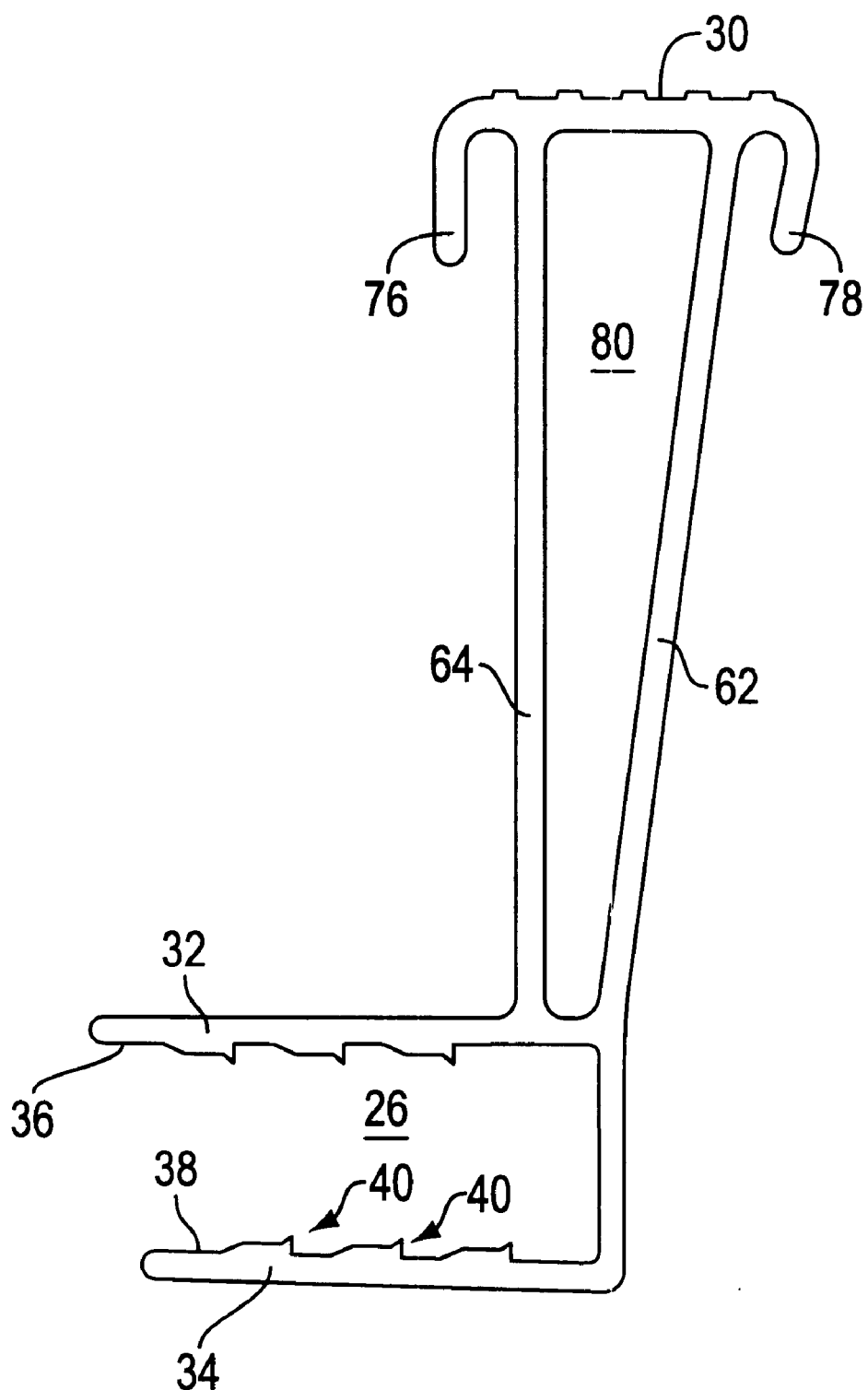
FIG. 2 is a cross-sectional view of the bunk step.
Figure 3:
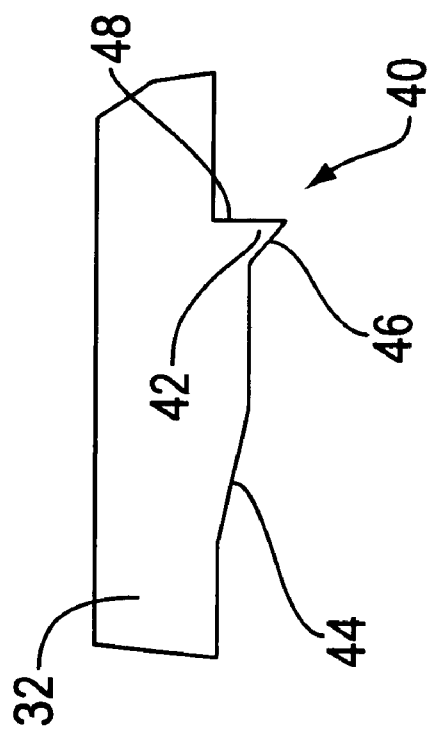
FIG. 3 is a detailed view of the teeth in the bunk step.

With reference to FIGS. 1, 2 and 3, the bunk front 10 can be seen to include an extrusion 22 defining a first portion 24 having an opening 26 and a second portion 28 extending generally vertically upwardly from one end of the first portion 24 and forming a step 30 at the upper end thereof. Preferably, the extrusion 22 is extruded aluminum.

The opening 26 in first portion 24 is defined between an upper section 32 and a lower section 34. The facing surfaces, 36 and 38 of the upper and lower sections 32 and 34 are each formed with teeth 40 which project inwardly into the opening 26. The teeth 40 can be of many configurations, but are illustrated in the figures to be a series of points 42 defined by relatively gradually inwardly sloped surfaces 44 and 46 on one side of the point 42 and a perpendicular surface 48 on the other side. The separation between facing points 42 on the upper section 32 and lower section 34 is less than the thickness T at the front end 50 of the bunk 12. Therefore, the assembler can simply push the bunk front 10 over the front end 50 of the bunk 12 with the teeth 40 engaging the upper and lower surfaces 52 and 54 of the bunk 12 until the front end 50 comes into contact with the inner end 56 of the opening 26 of the first portion 24. Also, as best seen in FIG. 1, the lower surface 54 of the bunk 12 forms a cut out portion 82 to help guide installation of the bunk front 10 on the bunk 12.

While the teeth 40 alone may be sufficient to securely place the bunk front 10 on the bunk 12, the attachment can be supplemented by a glue. For example, a urethane adhesive. For example, Morton's High Bond strength urethane adhesive number M511 or Brown's number 119005 would be suitable.

This design eliminates the need for mechanical fasteners. For example, a previously known design required the use of 24 mechanical fasteners which required significant effort to install.

A further advantage of the bunk front 10 is realized by providing the extrusion with a covering 60 which covers all or a portion of the extrusion 22. The covering 60 can be selected to have an opening to expose the step 30 on the bunk front 10 to allow the bunk front 10 to be used as a step for entry into an upper bunk. Further, it eliminates the need for additional parts, such as a ladder, for upper bunk ingress and egress. Alternatively, the covering 60 can completely cover the step 30 to conceal the step and appear as a simple conventional bunk front.

The covering 60 is readily installed on the extrusion 22. The extrusion 22 has a rear extension 76 and a front extension 78 on either side of the step 30. This permits the upper end 66 of the covering 60 to curl behind the rear extension 76 while the lower end 68 mates with the lower section 34. This eliminates the need to use fasteners to attach a pad at an interface. The covering 60 is preferably made of a cardboard plate 70, the upper end of which engages the front extension 78 while the lower end thereof engages the lower section 34, a cardboard plate 71, a vinyl covered foam pad 72 and vinyl covering 74.

As can be seen in FIGS. 1 and 2, the second portion 28 includes upwardly extending arms 62 and 64 which diverge to form an adequate width step 30 at the upper ends thereof. The interior 80 between them is hollow to reduce weight and material costs.

As is best seen in FIG. 2, the lower section 34 may be slightly angled toward the upper section from the front of the first portion, before it is engaged to the bunk 12. The natural resiliency of the first portion 24 allows the lower section 34 to deflect slightly away from the upper section 32 as the bunk front 10 is slid over the front end 50 of the bunk 12 to provide a more secure engagement between the bunk front 10 and the bunk 12.

One advantage of the present invention is that the wedging action of the first portion 24 and the engagement between teeth 40 and the bunk 12 provides an immediate securing of the bunk front 10 on the bunk 12. The bunk front 10 will therefore be securely positioned as any adhesive utilized therebetween solidifies. Further, the need to hold a bunk front in a predetermined position relative to a bunk while a series of fasteners are installed is eliminated. For example, prior designs required 24 mechanical fasteners to be installed. The covering 60 is also installed with no need for fasteners.

Although the present invention and its advantages have been described in detail herein, it should be understood that various changes, modifications and substitutions of parts and elements can be made without departing from the spirit and scope of the invention as defined by the appended claims.

I claim:

1. A bunk front for a bunk used in a vehicle, the bunk having a portion formed of a predetermined thickness adjacent a front edge of the bunk, the bunk front comprising:
    a first portion having an opening for placement on the portion of the bunk, the first portion having engagement members to engage the portion of the bunk to secure the first portion on the bunk; and
    a second portion defining a rigid second extension that forms, at least in part, a step, and the second portion being adapted to receive and to support a pad.

2. The bunk front of claim 1 wherein said engagement members are a plurality of teeth.

3. The bunk front of claim 1 further comprising adhesive to secure the first portion to the portion of the bunk.

4. The bunk front of claim 1 wherein the first portion and second portion are extruded.

5. The bunk front of claim 1 wherein the first portion and second portion are aluminum.

6. The bunk front of claim 1 further comprising a pad mounted on the first and second portions.

7. The bunk front of claim 6 wherein the pad covers the step.

8. The bunk front of claim 6 wherein the pad exposes the step.

9. The bunk front of claim 6 wherein the pad is installed without fasteners to the first and second portions.

10. The bunk front of claim 6 wherein the second portion defines a second extension, the pad engaging said extension.

11. The bunk front of claim 1 wherein the first portion has an upper section and a lower section, and the lower section is inclined toward the upper section to provide a wedging action as the first portion is placed over the portion of the bunk.

12. A method for installing a bunk front on a bunk, the method comprising the steps of:
    placing a first portion of the bunk front over a front end of the bunk, the first portion having engagement members to engage the bunk to secure the bunk front on the bunk,
    wherein the bunk front includes:
        the first portion, which is an open channel that is defined in part by the engagement members, which is adapted to closely receive the bunk; and
        a second portion, integrally extending from the first portion so as to form a rigid second extension, such second extension operatively defining a step.

13. The method of claim 12 further comprising the step of providing an adhesive between the open channel and the front end of the bunk to adhere the bunk front to the bunk.

14. The method of claim 12 further comprising the step of installing a pad on the first and second portions of the bunk front without fasteners.

15. The method of claim 12 wherein the step of placing the first portion over the front end of the bunk includes the step of deflecting a lower section of the first portion to wedge the first portion on the front end of the bunk.

16. A bunk front for attachment to a front edge of a vehicle bunk, the bunk front comprising:
    an extruded member having a first portion and a second portion,
    wherein the first portion is an open channel that is adapted to closely receive the front edge of the vehicle bunk, and
    wherein the second portion upwardly extends away from the first portion and forms a step vertically displaced above said first portion when operatively coupled to the vehicle bunk.

17. A vehicle bed comprising:
    a bunk platform to support an occupant; and
    a bunk front, attached to a front edge of the bunk platform, the bunk front comprising:
        an open channel that closely receives and operatively engages at least the front edge of the bunk platform; and
        a member extension that rigidly forms a step, wherein the member extension extends out from the open channel.

18. A vehicle bed comprising:
    a bunk platform to support an occupant; and
    a bunk front, attached to a front edge of the bunk platform, the bunk front comprising:
        a first portion having an opening to receive at least the front edge of the bunk platform, the first portion having engagement members to frictionally engage the bunk platform; and
        a member extension that rigidly forms a step, wherein the member extension extends out from the first portion.

* * * * *